Feb. 16, 1954     H. G. GREGORY     2,669,078
LEAF GATHERING AND DISPOSAL MACHINE
Filed Nov. 14, 1949     4 Sheets-Sheet 1

Inventor
HORACE G. GREGORY
By G. H. Braddock
ATTORNEY

Inventor
HORACE G. GREGORY

Feb. 16, 1954  H. G. GREGORY  2,669,078
LEAF GATHERING AND DISPOSAL MACHINE
Filed Nov. 14, 1949  4 Sheets-Sheet 4

Inventor
HORACE G. GREGORY
By G. H. Braddock
Attorney

Patented Feb. 16, 1954

2,669,078

UNITED STATES PATENT OFFICE 2,669,078

LEAF GATHERING AND DISPOSAL MACHINE

Horace G. Gregory, Sioux Falls, S. Dak.

Application November 14, 1949, Serial No. 127,124

1 Claim. (Cl. 55—118)

The invention herein presents a machine useful for a variety of purposes, such, for example, as picking up leaves from an area traversed by the machine, grinding the leaves picked up to a degree of fineness making them suitable for fertilizing purposes and returning the ground leaves to and in scattered condition over the area from which picked up; or picking up seed from a traversed area and depositing it to a location or locations where it is to be stored.

The object of the invention is to provide a machine of the character as stated which will be of simple, new and improved construction.

In the accompanying drawings forming a part of this specification,

Figure 1:
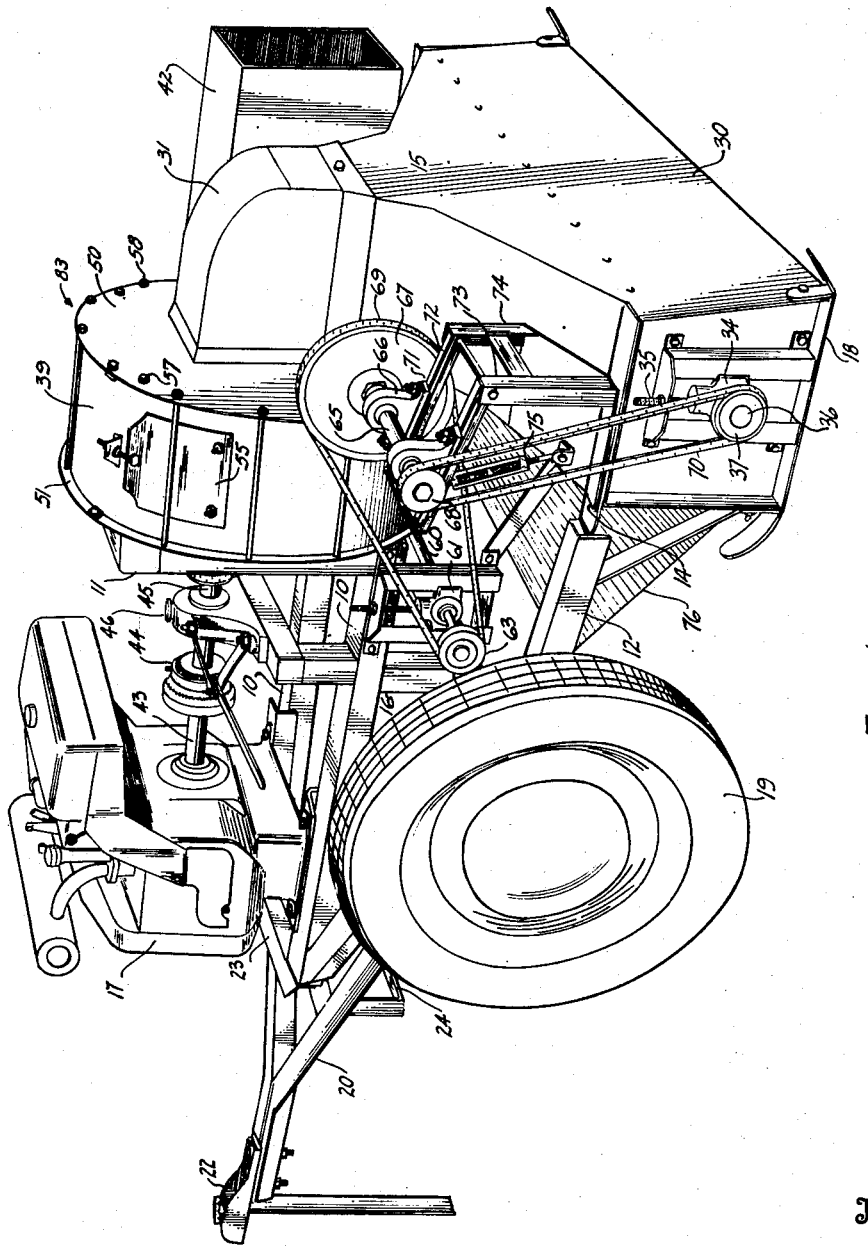
Fig. 1 is a perspective view of a machine incorporating the features and characteristics of the invention.
Figure 2:
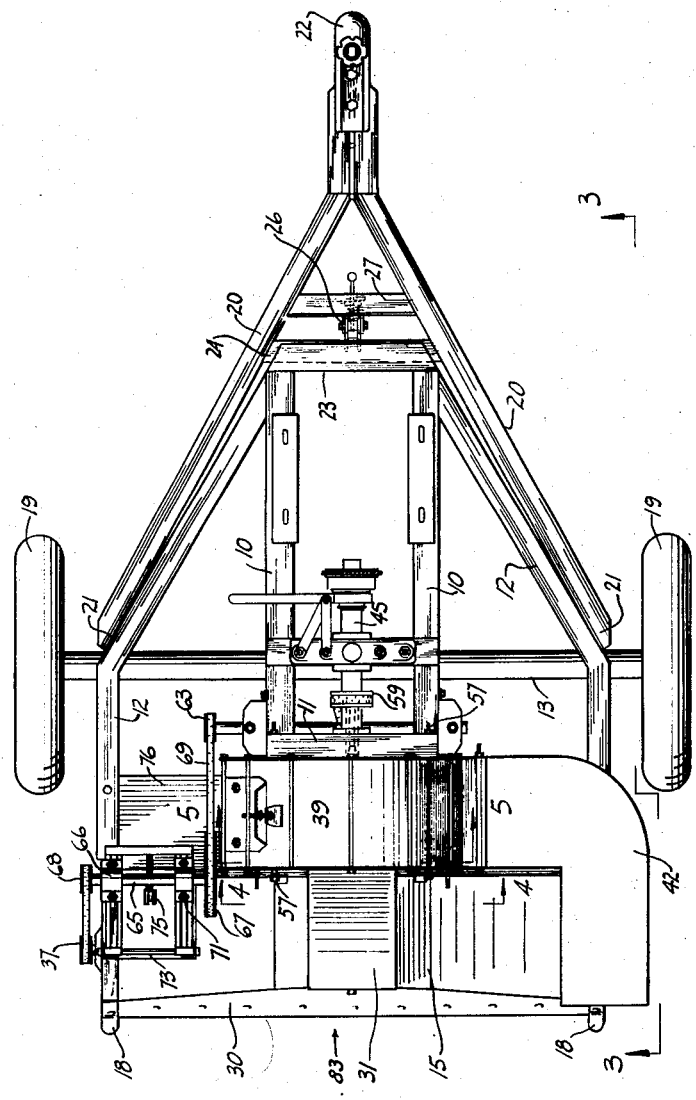
Fig. 2 is a top plan view of the machine on a reduced scale, parts being omitted.

With respect to the drawings and the numerals of reference thereon, a main frame of the machine, constituted as a rigid structure, includes longitudinal rails 10 supporting an upright member 11 at the rear thereof. Longitudinal side pieces 12 have their forward ends secured to the forward ends of the longitudinal rails 10, intermediate portions of said side pieces are secured to and pass over opposite end portions of an axle 13 of the machine, and rearward ends of the side pieces are secured, at 14, to an intake unit 15 of a combination suction, grinder and blower disposed rearwardly of said axle. Vertical elements 16 of the main frame integral with rearward portions of the longitudinal rails 10, disposed forwardly of the upright member 11 and between the side pieces 12, connect said longitudinal rails with the axle 13. The main frame and side pieces are rigidly welded to the axle at locations sufficiently forward of the center of balance to compensate for the weight of a motor 17 with appurtenances supported upon forward portions of the longitudinal rails 10, and cause overbalancing weight to be applied at the rear or combination suction, grinder and blower end of the machine adapted to insure that supporting shoes 18 on the intake unit 15 will engage the ground when this is intentional. The longitudinal rails 10, the upright member 11, the longitudinal side pieces 12 and the vertical elements 16 of the main frame together with the axle 13, the combination suction, grinder and blower, the motor and all of the appurtenances thereto make up a trailer body 83.

The trailer body 83 is supported by wheels 19 freely rotatable on opposite ends of axle 13 exteriorly of the side pieces 12.

A V-shape pull frame 20 is pivotally secured, as at 21, to intermediate portions of the side pieces 12, exteriorly of said side pieces, to extend forwardly in clearing relation to the main frame and the side pieces. As disclosed, the pull frame 20 is connected to said side pieces 12 at locations slightly forward of the axle 13. The forward end of said pull frame is fitted with a ball hitch 22 of a well known type for detachably connecting the machine to a towing machine, such as a truck or tractor.

Figure 3:
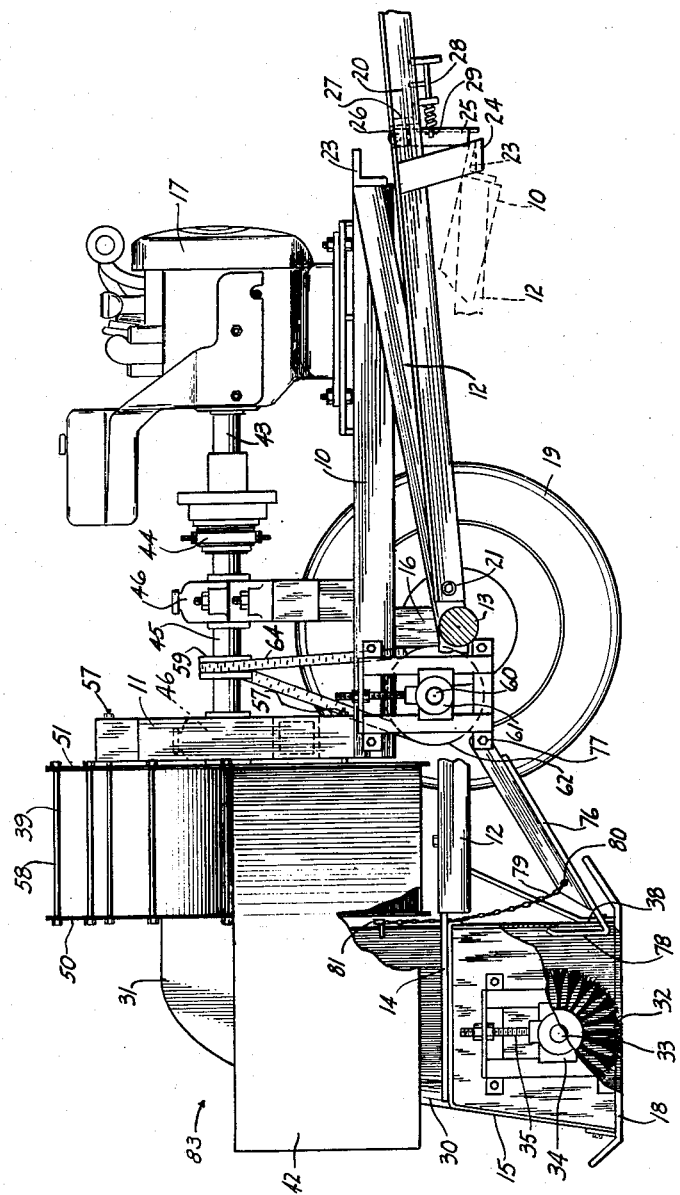
Fig. 3 is a vertical sectional view, taken on line 3—3 in Fig. 2, disclosing the machine in side elevation with parts broken away and in section.

The forward ends of the longitudinal rails 10 rigidly support a transverse angle bar 23 adapted to be engaged against a stop piece 24 rigidly supported by and situated beneath an intermediate portion of the pull frame 20. A dog 25 is rotatably mounted, at 26, on a cross piece 27 of said pull frame forward of said transverse angle bar 23 to extend downwardly from the pull frame. A manipulator 28, supported upon a lower portion of said pull frame forward of the dog 25 for forward and rearward adjustment, has its rear end secured, as at 29, to an intermediate portion of said dog. The construction and arrangement are such that the manipulator 28 can be adjusted rearwardly to situate the lower end of the dog directly above the stop piece 24, or forwardly to situate said dog forwardly of said stop piece. When it is desired to support the machine in a forwardly tilted position, as when travelling over a roadway, the forward end of the main frame and the transverse angle bar 23 will be pushed downwardly until said transverse angle bar rests against the stop piece 24, and the dog 25 will be adjusted rearwardly so that its lower end will be disposed above and engaged against an upper surface of the transverse angle bar, as disclosed in full and dotted lines in Fig. 3 of the drawings. Supporting the machine in forwardly tilted position in the manner as described will cause the weight of the pull frame 20 to be added forward of the center of balance, and the construction and arrangement will be such that the addition of the weight of said pull frame forwardly of the center of balance will cause the center of balance to move from a position rearward of the axle 13 to a position forward of said axle. In this condition, with part of the weight resting on the towing machine, the machine can be towed at high speeds between locations for use. When the machine is to be put to use, the dog 25 will be released from the transverse angle bar 23 so the supporting shoes 18 will assume their natural position of rest upon the ground.

The intake unit 15 includes a downwardly flared, lower intake member 30 extending the full width of the machine, and an upwardly extending and forwardly curved conveying member 31.

A rotary rake or brush 32, desirably having a multiplicity of tufts or separate bunches of bristles, is rigid with a transverse shaft 33 rotatably mounted in spaced bearings 34 supported, as at 35, upon opposite side walls of the intake member 30 for vertical adjustment. The transverse shaft 33 includes an extension portion 36 disposed exteriorly of said intake member rigidly supporting a pulley 37. The rotary rake or brush 32 spans the intake member 30 in direction transversely of the machine, and the transverse shaft 33 is vertically adjustable to the end that said rotary rake or brush can be situated in desired relation to the ground to wipe thereover as the machine is advanced. The construction and arrangement will be such that the rotary rake or brush will rotate to cause peripheral travel at its lower portion to be forward. Thus leaves, seed, or other loose and relatively light material, will be brushed ahead and upwardly to be readily taken up in a manner to be made plain. The intake member 30 is open at its bottom, is supported at its opposite sides by the shoes 18, and is closed at it rear, opposite sides and front except for a transverse opening 38 in the lower portion of the forward wall of said intake member, above and contiguous with the shoes 18.

The combination suction, grinder and blower also includes a generally curvilinear shell 39 into which the forward, upper end of the curved conveying member 31 opens substantially centrally, and said shell 39 includes an eccentric lower peripheral portion 40 and a substantially tangential outlet portion 41, contiguous with said eccentric lower peripheral portion at the outlet side thereof, which opens to the inlet end of a discharge elbow member 42 including a rearwardly facing outlet passageway.

The motor 17, which as disclosed is an internal combustion engine, includes a rearwardly extending, longitudinal drive shaft 43 adapted to be releasably clutched, as at 44, to a driven main shaft 45 alined with said drive shaft and mounted in main bearings 46 suitably and conveniently supported upon the main frame. The driven main shaft 45 extends to position rearwardly of the upright member 11 and its rearward portion rigidly supports a fan hub 47 situated within the shell 39 in alined relation with the adjacent end of the conveying member 31 forwardly thereof. Said main shaft 45 is concentric with the upper portion of the shell 39.

The fan hub 47 rigidly supports a series of notched fan blades 48, six as shown, and an annular fan plate 49 contiguous with a forward edge of each of said fan blades. The fan blades 48 and the annular fan plate 49 provide a combination suction fan and hammer mill rotor, operative in a manner to be set forth, contained in a housing consisting of a rear plate 50, a front plate 51 and said shell 39.

The shell 39 has a constant radius along an arc extending from a location indicated 52 to a location denoted 53, at the top of said shell, and below the location 53 the curve of the shell is of constantly increasing dimension. A hammer mill screen 54, substantially of the same radius as the part of the shell 39 extending between the locations 52 and 53, has its opposite ends secured, at 53 and 52, to said shell. The end of the hammer mill screen at or adjacent to the location 53 is secured to the shell 39 by bolts extending through slotted holes in said shell supported in an adjusting plate 55 upon the shell. The construction and arrangement are such that the hammer mill screen can be adjusted inwardly and outwardly relative to the notched fan blades 48.

The housing rear plate 50 has a square, substantially centrally disposed opening 82 the center of which is alined with the longitudinal axis of the driven main shaft 45, and the adjacent end of the conveying member 31 is removably fitted and secured in said opening 82. The housing front plate 51 is rotatably mounted upon said driven main shaft. The marginal portions of said rear and front plates 50 and 51 are interconnected by clamping bolts 58 which retain the rear and front plates up against the opposite side edges of the shell 39.

Figure 4:
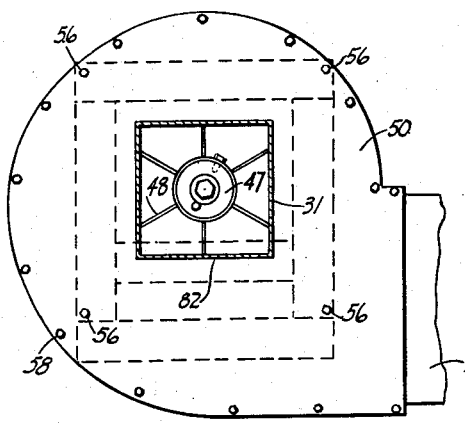
Fig. 4 is an enlarged sectional view, taken on line 4—4 in Fig. 2.
Figure 6:
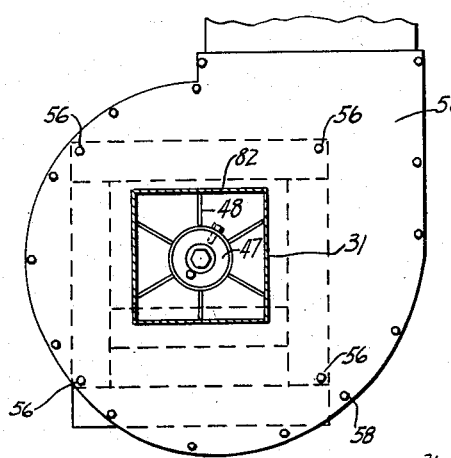
Fig. 6 is a view corresponding generally with the disclosure of Fig. 4, but showing parts in different positions.
Figure 7:
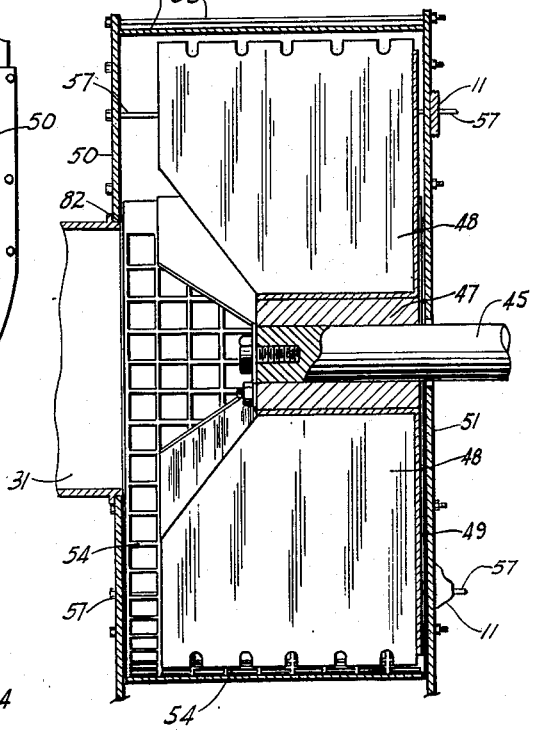
Fig. 7 is a detail sectional view on an enlarged scale, taken as on line 7—7 in Fig. 5.
Figure 8:
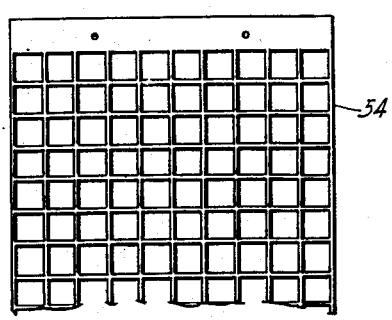
Fig. 8 is a fragmentary plan view of a portion of a perforated strip of material which can be employed to provide a hammer mill screen of the machine.

Stay bolt holes 56 in the housing rear and front plates 50 and 51 and the upright member 11 of the main frame of the machine, disposed exteriorly of the fan blades 48 and the annular fan plate 49, form a square having a common center with the driven main shaft 45. The construction and arrangement are such that the unit consisting of the rear and front plates 50 and 51 and the shell 39 with appurtenances can be rotatably adjusted to be situated as in either Fig. 4 or Fig. 6 of the drawings while stay bolts 57 are removed from the holes 56 and the rear plate 50 is removed from the conveying member 31. In either position, stay bolt holes in the rear and front plates and main frames upright member, as well as the opening 82 and the forward end of the conveying member 31, will be alined so that the combination suction, grinder and blower can be made rigid with the frame selectively to discharge horizontally, as in said Fig. 4, as when material such as ground leaves is to be strewn over an area from which collected, or vertically upward, as in said Fig. 6, as when material such as seed is to be deposited to a storing location. When material is to be picked up and stored, and not ground or otherwise mutilated, the hammer mill screen 54 will be removed. The storing of the material or seed can be accomplished in any preferred manner, as by delivering to a storage conveyance towed, or otherwise transported, along with the machine. The elbow discharge member 42 can be replaced by a member of any desired configuration when the machine is to be operative to pick up and store seed or other material.

A main drive pulley 59, fixedly supported on the driven shaft 45, is for causing the transverse shaft 33 to be rotated through the instrumentality of a speed reducing connection including the pulley 37.

A transverse intermediate shaft 60, mounted in spaced bearings 61 supported for vertical adjustment on a portion of the machine frame below the driven shaft 45, fixedly supports a relatively large pulley 62 situated along the length and a comparatively small pulley 63 situated at an end of said transverse intermediate shaft. A V-belt 64 rides the pulleys 59 and 62, and the transverse intermediate shaft is adjustably mounted to the end that said V-belt can be properly tensioned.

A transverse stub shaft 65, mounted in spaced bearings 66 at the side of the intake unit 15 opposite the elbow discharge member 42, fixedly supports a relatively large pulley 67 situated at one end of said transverse stub shaft in longitudinal alinement with the pulley 63 and a comparatively small pulley 68 situated at the opposite end of the transverse stub shaft. A V-belt 69 rides the pulleys 63 and 67. The pulley 68 is above and substantially in vertical alinement with the pulley 37, and a V-belt 70 rides said pulleys 68 and 37.

The spaced bearings 66 are mounted, as at 71, for slidable adjustment longitudinally of the machine upon a supporting frame 72 having its rearward end pivotally mounted, as at 73, on a bracket 74 upon the intake unit 15. A turnbuckle 75, having its lower end pivotally supported upon said intake unit and its upper end pivotally connected to a forward portion of the supporting frame 72, is for accomplishing vertical swinging adjustment of said supporting frame. The spaced bearings 66 are longitudinally adjustable to the end that the V-belt 69 can be properly tensioned, and the supporting frame 72 is vertically adjustable to the end that the V-belt 70 can be properly tensioned. The construction and arrangement as illustrated and described makes possible adjustment of the transverse stub shaft 65 so that it can be set at any selected and predetermined distance from each of the transverse shaft 33 and the transverse intermediate shaft 60.

A transversely extending apron 76, for directing leaves, seed, etc., to the transverse opening 38 in the front wall of the intake member 30, has its forward end pivotally mounted, as at 77, upon fixed parts of the machine. A rearward portion of said apron projects through said transverse opening 38 into said intake member, and an upturned rearward end 78 of the apron is situated within the intake member in adjacent relation to its front wall. A cable 79, having its lower end connected, as at 80, to a rearward, lower part of the apron 76 and its upper end adjustably connected, as at 81, to a part of the intake unit 15, is for accomplishing vertical swinging adjustment of said apron. Not only does the apron 76 function to direct leaves, seed, etc. to the transverse passageway or opening 38. Also, by adjustment of said apron the size of the passageway or opening permitted into the intake unit can be controlled.

In practical operation, the machine will be drawn over an area to be cleared by a truck, tractor, or other vehicle. The apron 76 will be set at a height having tendency toward precluding the existence of air spaces between the leaves, seed, etc. and the apron, thus to cause a maximum of intake suction to be applied to material being picked up.

Figure 5:
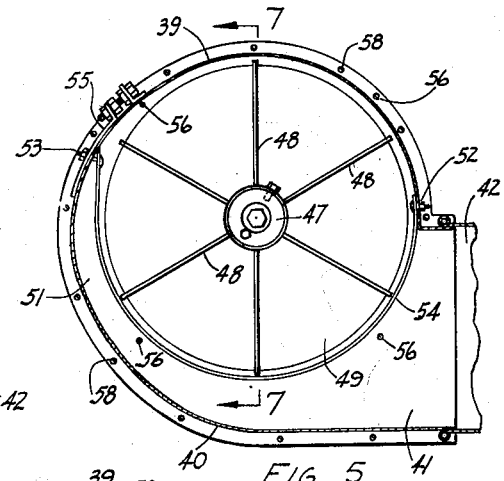
Fig. 5 is an enlarged sectional view, taken on line 5—5 in Fig. 2.

The combination suction fan and hammer mill rotor functions to create suction in the intake unit 15, to act as a grinder median in conjunction with the hammer mill screen 54, and to create a blast for forcing comminuted material through and out of the fan housing. Upon rotation of said combination suction fan and hammer mill rotor, in counterclockwise direction in Fig. 5, the notched outer ends of the fan blades 48 travel inwardly from a circumference spaced inwardly from the upper portion of the shell 39 so as to permit a circulatory flow of the intaken material, and the notched ends of said fan blades travel close to the interior surface of the hammer mill screen, in direction from left toward right in said Fig. 5. The fan blades 48 are cut away on their intake sides and centrally of the suction fan and hammer mill rotor, adjacent the fan hub 47. Thus a central space for reception of leaves, seed, etc. by the fan housing is provided, and from this space the received material is spread in all directions radially of the shell 39. The admitted material, when to be comminuted, is forced or driven annularly and downwardly and distributed upon the hammer mill screen, whence it is torn into particles of size to be blown through said hammer mill screen. Thence the material is discharged from the machine. The degree of fineness of the particles will be a function of the size of the openings through the hammer mill screen. In an instance when the material, such as seed, is not to be comminuted the operation as described will be the same, except that a hammer mill screen, such as 54, will not be employed.

As hereinbefore stated, the rotary rake or brush 32, together with the transverse shaft 33 as a unit, revolves in direction causing its lower portion to be wiped forwardly. The forward portion of said rotary rake or brush rotates upwardly, and thus tendency toward upward movement in a forward portion of the intake member adjacent its forward wall is imparted to material, such as leaves, seed, etc., being picked up.

What is claimed is:

A machine for picking up and grinding debris such as leaves or the like comprising in combination a horizontally disposed axle, a pair of wheels mounted in a vertical plane one on each opposite end of said axle to be rotatable relative thereto, a trailer body mounted on top of said axle to be supported thereby, a pull frame pivotally attached to the front of said trailer body to extend therefrom in a substantially horizontal plane, a debris intake unit rigidly mounted on top of said trailer body to depend therefrom and extend substantially to a horizontal plane defined by the lower surfaces of said pair of wheels, a debris suction and grinder and blower combined unit mounted on top of said trailer body in a single housing to be attached to and in suction communication with said debris intake unit, a debris discharge member attached to said combined unit on a side functionally opposite from that of said intake unit to be in blower communication with said combined unit and having a debris outlet directed rearwardly with respect to said trailer body, a prime mover mounted on said trailer body to be operably attached to said combined unit to empower the same.

HORACE G. GREGORY.

(References on following page)

References Cited in the file of this patent

UNITED STATES PATENTS

| Number | Name | Date |
|---|---|---|
| D. 153,673 | Elliotte | May 10, 1949 |
| 740,063 | Thompson | Sept. 29, 1903 |
| 1,844,750 | Ellis | Feb. 9, 1932 |
| 2,105,803 | Barnes | Jan. 18, 1938 |
| 2,160,275 | Magee et al. | May 30, 1939 |
| 2,182,077 | Feigelsor | Dec. 5, 1939 |
| 2,217,871 | Lindgren | Oct. 15, 1940 |
| 2,242,922 | Poynter | May 20, 1941 |
| 2,328,343 | Jacob | Aug. 31, 1943 |
| 2,349,386 | Stoetzl et al. | May 23, 1944 |
| 2,463,729 | Synck et al. | Mar. 8, 1949 |
| 2,538,643 | Gregory | Jan. 16, 1951 |

FOREIGN PATENTS

| Number | Country | Date |
|---|---|---|
| 133,119 | Switzerland | Aug. 1, 1929 |
| 446,483 | Great Britain | Apr. 30, 1936 |